United States Patent
Yip et al.

(10) Patent No.: US 11,503,382 B2
(45) Date of Patent: Nov. 15, 2022

(54) METHOD AND DEVICE FOR TRANSMITTING VIDEO CONTENT AND METHOD AND DEVICE FOR RECEIVING VIDEO CONTENT

(71) Applicant: Samsung Electronics Co., Ltd., Suwon-si (KR)

(72) Inventors: Eric Yip, Suwon-si (KR); Jaehyeon Bae, Suwon-si (KR); Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/277,996

(22) PCT Filed: Sep. 30, 2019

(86) PCT No.: PCT/KR2019/012747
§ 371 (c)(1),
(2) Date: Mar. 19, 2021

(87) PCT Pub. No.: WO2020/071709
PCT Pub. Date: Apr. 9, 2020

(65) Prior Publication Data
US 2021/0360332 A1 Nov. 18, 2021

Related U.S. Application Data

(60) Provisional application No. 62/739,509, filed on Oct. 1, 2018.

(51) Int. Cl.
*H04N 21/81* (2011.01)
*H04N 13/194* (2018.01)
(Continued)

(52) U.S. Cl.
CPC ......... *H04N 21/816* (2013.01); *H04N 13/194* (2018.05); *H04N 21/2353* (2013.01);
(Continued)

(58) Field of Classification Search
CPC .............. H04N 21/816; H04N 13/194; H04N 21/234345; H04N 21/2353;
(Continued)

(56) References Cited

U.S. PATENT DOCUMENTS

| 9,414,123 B2 | 8/2016 | Yie et al. |
| 2018/0020248 A1 | 1/2018 | Lai et al. |

(Continued)

FOREIGN PATENT DOCUMENTS

| EP | 3419301 A1 | 12/2018 |
| JP | 2018-148574 A | 9/2018 |

(Continued)

OTHER PUBLICATIONS

MMT GROUP, "Carriage and Signaling of R content in MMT", XP030260037, Jul. 18, 2017.
(Continued)

*Primary Examiner* — Anthony Bantamoi
(74) *Attorney, Agent, or Firm* — Jefferson IP Law, LLP

(57) ABSTRACT

The present disclosure relates to a method and device for transmitting and receiving video content including three-dimensional (3D) data. The method of transmitting video content through a plurality of assets includes identifying whether content transmitted through an asset is a sub-picture; when the content transmitted through the asset is the sub-picture, generating sub-picture asset information comprising information about other sub-pictures constituting a composition picture together with the sub-picture; and transmitting the sub-picture asset information and the content.

17 Claims, 15 Drawing Sheets

(51) Int. Cl.
*H04N 21/2343* (2011.01)
*H04N 21/235* (2011.01)
*H04N 21/4402* (2011.01)
*H04N 21/854* (2011.01)

(52) U.S. Cl.
CPC . *H04N 21/234345* (2013.01); *H04N 21/4402* (2013.01); *H04N 21/85406* (2013.01)

(58) Field of Classification Search
CPC ......... H04N 21/4402; H04N 21/85406; H04N 21/21805; H04N 21/2381; H04N 21/4728; H04N 21/84; H04N 13/111; H04N 13/139; H04N 13/172; H04N 21/2387; H04N 21/6587
See application file for complete search history.

(56) References Cited

U.S. PATENT DOCUMENTS

| | | | |
|---|---|---|---|
| 2018/0103072 A1 | 4/2018 | Liu et al. | |
| 2018/0160160 A1* | 6/2018 | Swaminathan | H04N 21/2662 |
| 2018/0199071 A1* | 7/2018 | Wang | H04N 19/70 |
| 2018/0277164 A1 | 9/2018 | Wang | |
| 2019/0082178 A1* | 3/2019 | Kim | H04N 19/119 |
| 2019/0253734 A1 | 8/2019 | Lee et al. | |

FOREIGN PATENT DOCUMENTS

| | | |
|---|---|---|
| KR | 10-2013-0058647 A | 6/2013 |
| WO | 2018/169139 A1 | 9/2018 |

OTHER PUBLICATIONS

"Revised text of ISO/IEC FDIS 23090-2 Omnidirectional Media Format", 122. MPEG Meeting; XP030262104, May 11, 2018.
Yiling Xu et al, "Transmission indication of omnidirectional videos in MMT", 119. MPEG Meeting; XP030259864, Jul. 15, 2017.
Yiling Xu et al, "Omnidirectional Media Format and Its Application to Immersive Video Streaming: An Overview", XP55602670, Jan. 1, 2018.
Extended European Search Report dated Jul. 12, 2021, issued in European Patent Application No. 19868706.3-1209.
International Search Report dated Jan. 15, 2020, issued in International Patent Application No. PCT/KR2019/012747.

* cited by examiner

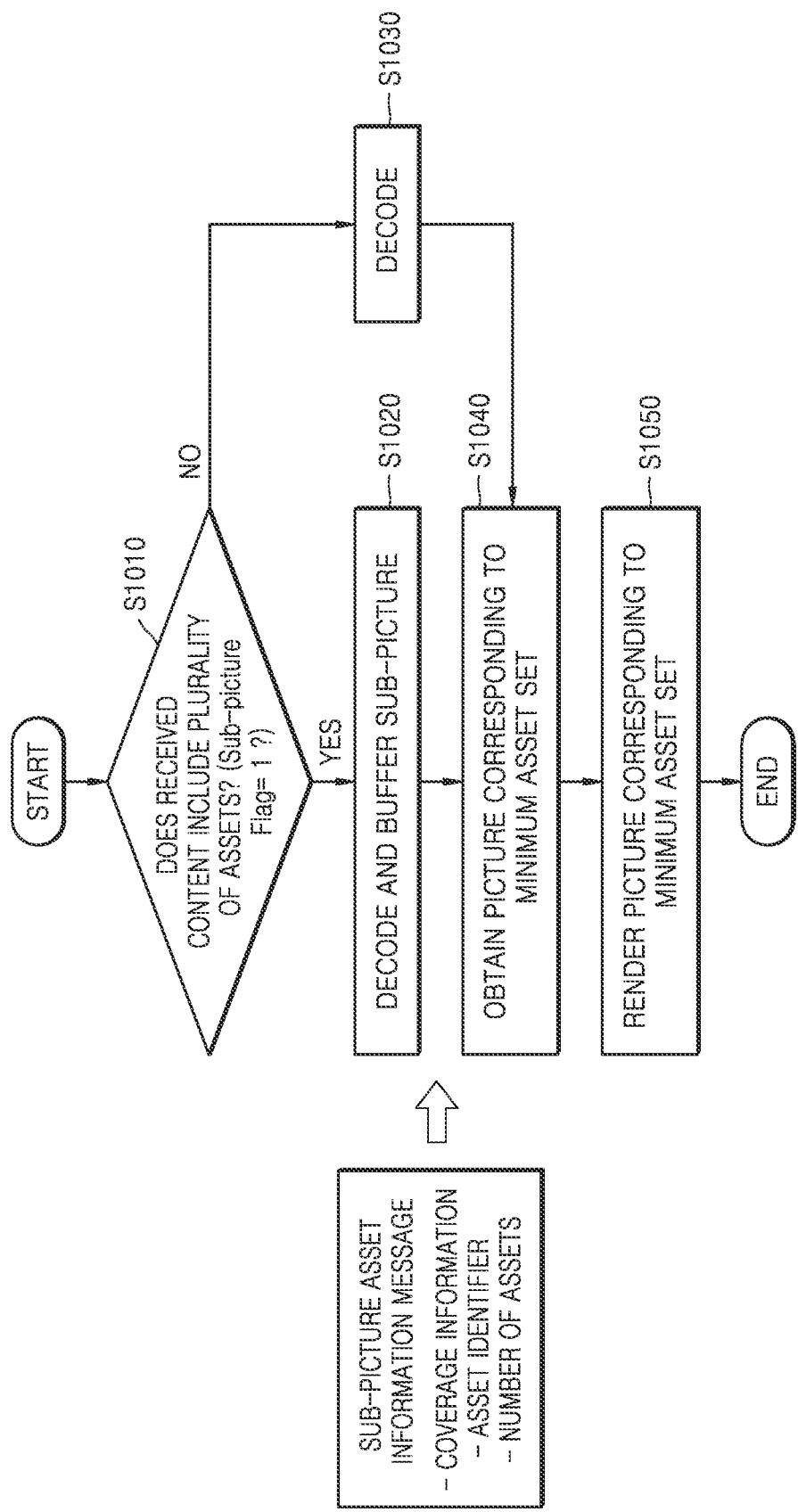

FIG. 11

| Syntax | Value | No. of bits | Mnemonic |
|---|---|---|---|
| VR_information_descriptor() { | | | |
|     descriptor_tag | | 16 | uimsbf |
|     descriptor_length | | 8 | uimsbf |
|     rwfp_flag | | 1 | bslbf |
|     srqr_flag | | 1 | bslbf |
|     2dqr_flag | | 1 | bslbf |
|     viewingspace_info_flag | | 1 | bslbf |
|     sub_picture_flag | | 1 | bslbf |
|     reserved | '111' | 3 | bslbf |
|     ProjectionFormatStruct() | | | |
|     InitialViewingOrientationSample() | | | |
|     ContentCoverageStruct() | | | |
|     if(rwfp_flag == 1) { | | | |
|         RegionWisePackingStruct() | | | |
|     } | | | |
|     if(srqr_flag == 1) { | | | |
|         SphereRegionQualityRankingBox() | | | |
|     } | | | |
|     if(2dqr_flag == 1) { | | | |
|         2DRegionQualityRankingBox() | | | |
|     } | | | |
|     if(viewingspace_info_flag == 1) { | | | |
|         ViewingSpaceStruct() | | | |
|     } | | | |
| } | | | |

FIG. 12

| Application Message Type | Application Message Name |
|---|---|
| 0x01 | VRViewDependentSupportQuery |
| 0x02 | VRViewDependentSupportResponse |
| 0x03 | VRViewportChangeFeedback |
| 0x04 | VRViewDependentAssetInformation |
| 0x05 | VRROIGuide |
| 0x06 | VR3DAudioAssetInformation |
| 0x07 | VRSubPictureAssetInformation |
| 0x08 | VRViewpointInformation |
| 0x9-0xFF | Reserved for future use |

FIG. 13

| Syntax | Value | No. of bits | Mnemonic |
|---|---|---|---|
| Application() { | | | |
|     message_id | | 16 | uimsbf |
|     version | | 8 | uimsbf |
|     length | | 1 | bslbf |
|     message_payload{ | | | |
|         application_identifier() | | | |
|         if(application_identifier == "urn:mpeg:mmt:app:vr:2018") | | | |
|         { | | | |
|         app_message_type | | 8 | uimsbf |
|         if(app_message_type == 0x07) { | | | |
|             ContentCoverageInfoStruct() | | | |
|             number_of_assets | | 8 | uimsbf |
|             for (i=0; i<number_of_assets; i++) { | | | uimsbf |
|                 asset_id_length | | 32 | uimsbf |
|                 for (j=0; j<asset_id_length; j++) { | | | uimsbf |
|                     asset_id_byte | | 8 | |
|                 } | | | |
|             ContentCoverageInfoStruct() | | | |
|         } | | | |
|     } | | | |
| } | | | |

METHOD AND DEVICE FOR TRANSMITTING VIDEO CONTENT AND METHOD AND DEVICE FOR RECEIVING VIDEO CONTENT

TECHNICAL FIELD

The present disclosure relates to a method and device for transmitting and receiving video content including three-dimensional (3D) data.

BACKGROUND ART

Virtual reality refers to an interface between a user and a device that makes a specific environment or situation in a computer and makes it as if the user who uses the computer is interacting with the real environment and situation. Virtual reality technology allows users to feel a sense of reality through manipulated sensory stimulation, and may be used in many industrial fields such as gaming, education, medicine, and journalism.

In recent years, as people's interest in virtual reality is increasing, technology for realizing virtual reality has been actively developed. In particular, research on a technology for processing images constituting a virtual space necessary for realizing virtual reality has been actively conducted. For example, with the development of technology related to a virtual reality image, users may view 360-degree images rather than flat images.

DESCRIPTION OF EMBODIMENTS

Technical Problem

In a three-dimensional (3D) image encoding process, region-wise packing may be performed to increase overall compression efficiency or to process a resolution of a region corresponding to a specific viewport higher than that of another region. A server may generate a plurality of sub-picture tracks (or a plurality of assets) from a packed picture generated through region-wise packing and transmit only data related to at least one selected from the plurality of tracks in order to reduce an amount of transmission of data related to a 3D image. In this regard, in order to prevent a hole from being generated in the 3D image provided to a user, information about a minimum sub-picture set required for rendering needs to be provided to a terminal.

Solution to Problem

According to an aspect of the present disclosure, a method of transmitting video content through a plurality of assets includes identifying whether content transmitted through an asset is a sub-picture; generating sub-picture asset information comprising information about other sub-pictures constituting a composition picture together with the sub-picture when the content transmitted through the asset is the sub-picture; and transmitting the sub-picture asset information and the content.

According to another aspect of the present disclosure, a server for transmitting video content through a plurality of assets includes a communication interface; and at least one processor connected to the communication interface, wherein the at least one processor is configured to control the communication interface to identify whether content transmitted through an asset is a sub-picture, generate sub-picture asset information comprising information about other sub-pictures constituting a composition picture together with the sub-picture when the content transmitted through the asset is the sub-picture, and transmit the sub-picture asset information and the content.

According to another aspect of the present disclosure, a method of receiving video content through a plurality of assets includes receiving an asset descriptor; determining whether content received through an asset is a sub-picture based on the asset descriptor; when the content received through the asset is the sub-picture, identify sub-picture asset information comprising information about other sub-pictures constituting a composition picture together with the sub-picture; and receiving and rendering the content based on the sub-picture asset information.

According to another aspect of the present disclosure, a device includes a communication interface configured to receive video content through a plurality of assets; and at least one processor connected to the communication interface, wherein the at least one processor is configured to, based on an asset descriptor received through the communication interface, determine whether content received through an asset is a sub-picture, when the content transmitted through the asset is the sub-picture, identify sub-picture asset information comprising information about other sub-pictures constituting a composition picture together with the sub-picture, and receive and render the content based on the sub-picture asset information.

BRIEF DESCRIPTION OF DRAWINGS

FIG. 10 is a flowchart illustrating a method in which a receiving device receives and processes video content, according to an embodiment of the present disclosure.

FIG. 11 is a diagram illustrating syntax of an asset descriptor transmitted with content, according to an embodiment of the present disclosure.

FIG. 12 is a table listing virtual reality application message types used to transmit virtual reality content, according to an embodiment of the present disclosure.

FIG. 13 illustrates syntax of sub-picture asset information transmitted with content, according to an embodiment of the present disclosure.

BEST MODE

Figure 1:
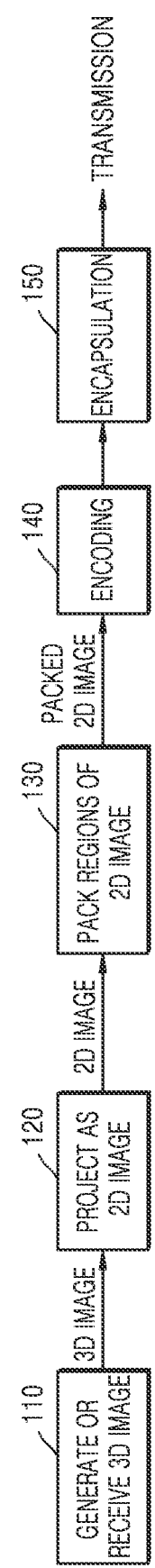
FIG. 1 shows a general data processing process of a transmitting device for transmitting data related to a three-dimensional (3D) image, according to an embodiment of the present disclosure.

According to an aspect of the present disclosure, a method of transmitting video content through a plurality of assets includes identifying whether content transmitted through an asset is a sub-picture; when the content transmitted through the asset is the sub-picture, generating sub-picture asset information comprising information about other sub-pictures constituting a composition picture together with the sub-picture; and transmitting the sub-picture asset information and the content.

MODE OF DISCLOSURE

Hereinafter, embodiments of the disclosure will be described in detail by referring to the accompanying drawings, for one of ordinary skill in the art to easily execute the embodiments. However, the disclosure may be embodied in various different forms and is not limited to the embodiments described herein. Also, in the drawings, aspects of the disclosure that are not relevant to the descriptions are omitted for clearly describing the disclosure. Also, throughout the specification, like elements are referred to by like reference numerals.

One or more embodiments of the disclosure may be described as functional block components and various processing operations. All or part of such functional blocks may be realized by any number of hardware and/or software components configured to perform the specified functions. For example, the functional blocks of the disclosure may be implemented with one or more micro-processors or with circuit structures for certain functions. Also, for example, the functional blocks of the disclosure may be implemented with various programming or scripting languages. The functional blocks may be implemented with algorithms executed by one or more processors. Furthermore, the disclosure may employ techniques according to the related art for electronics configuration, signal processing and/or data control.

Furthermore, the connecting lines, or connectors shown in the drawings are intended to represent example functional relationships and/or physical or logical couplings between the various elements. It should be noted that many alternative or additional functional relationships, physical connections or logical connections may be present in a practical device.

In the present specification, the term "image" may include all of a still image, a moving image, a video frame, and/or a video stream, and may include both a 2D frame and a 3D frame. For example, the "image" may include a 3D frame represented by a point cloud or a 360 degree omnidirectional media frame.

The term "image" used throughout the present specification is used as not only the term "image" itself but also a generic term to describe various forms of video image information that may be known in related fields such as "picture", "frame", "field" or "slice". For example, the "image" may mean one of a plurality of pictures or a plurality of frames constituting video content, or may mean the entire video content including the plurality of pictures or the plurality of frames.

Hereinafter, the disclosure will be described in detail with reference to the accompanying drawings.

FIG. 1 shows a general data processing process of a transmitting device for transmitting data related to a three-dimensional (3D) image according to an embodiment of the present disclosure. For example, the transmitting device according to an embodiment may be a server for providing data or services related to the 3D image. 3D images may refer to both dynamic and static images. In addition, the data related to the 3D image may include immersive media data including 360-degree omnidirectional virtual reality content or content related to 6 degrees of freedom.

In operation 110 of FIG. 1, the transmitting device may obtain the 3D image. As an example, the transmitting device may generate the 3D image by stitching images obtained from a plurality of cameras captured in various directions. As another example, the transmitting device may receive data related to an already generated 3D image from the outside. For example, the 3D image may be rendered in any one of a sphere, a cube, a cylinder, or an octahedron. However, the present disclosure is not limited to the type of the 3D image, and various types of 3D images may be generated or received.

In operation 120, the transmitting device may generate a 2D image by projecting the 3D image in space onto a 2D plane. The transmitting device according to an embodiment may perform projection in which an omnidirectional image in a 3D space is projected onto a rectangular picture of a determined format.

In order to project the 3D image as the 2D image, any one of equirectangular projection (ERP), octahedron projection (OHP), cylinder projection, cube projection, and various projection methods available in the relevant technical field may be used.

In operation 130, the transmitting device may pack the projected 2D image. Packing may mean generating a new 2D image (that is, the packed 2D image) by changing a location, a size, and a direction of at least a part of a plurality of regions constituting the projected 2D image. For example, for packing, resizing, transforming, rotating and/or re-sampling (e.g., upsampling, downsampling, and differential sampling according to a position within a region), etc. of the region may be performed.

The transmitting device according to an embodiment of the present disclosure may perform region-wise packing on the projected 2D image. In a region-wise packing process, the transmitting device may change locations, sizes, and directions of regions constituting a projected image. In addition, the transmitting device may process the composition of a picture by increasing the overall compression efficiency or processing a resolution of a region corresponding to a specific viewport to be higher than that of other regions such that the picture may be used for processing based on a user's viewpoint, thereby generating the packed picture.

Figure 2:
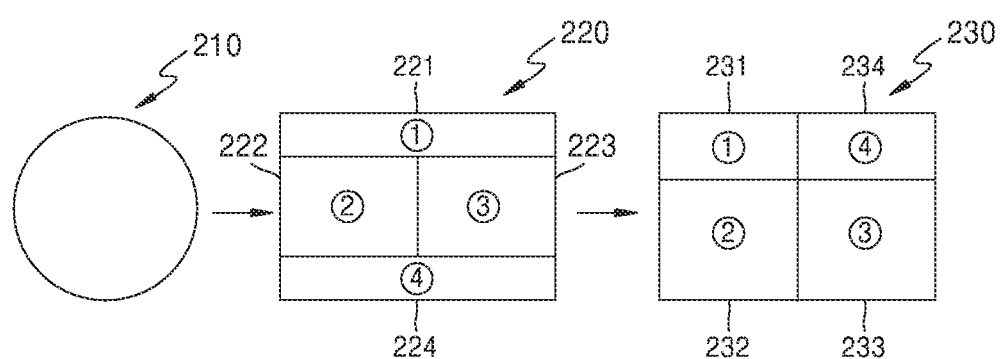
FIG. 2 is a diagram illustrating a method of projecting a 3D image as a 2D image and packing the projected 2D image, according to an embodiment of the present disclosure.

FIG. 2 is a diagram illustrating a method of projecting a 3D image 210 as a 2D image 220 and packing the projected 2D image according to an embodiment of the present disclosure.

As shown in FIG. 2, for example, the 3D image 210 may have a spherical shape. A transmitting device according to an embodiment may generate the projected 2D image 220 by projecting the 3D image 210 by an ERP method. The transmitting device may divide the projected 2D image 220 into a plurality of regions 221, 222, 223, and 224. In FIG. 2, a case in which the projected 2D image 220 is divided into four regions is illustrated as an example, but the present disclosure is not limited to the example illustrated in FIG. 2. The projected 2D image 220 may be divided into various numbers and various shapes. The method in which the transmitting device divides the projected 2D image 220 may variously change according to embodiments.

The transmitting device according to an embodiment may generate a packed 2D image 230 from the projected 2D image 220. The transmitting device may generate the packed 2D image 230 by modifying and or rearranging the plurality of regions 221, 222, 223, and 224 of the projected 2D image 220. The plurality of regions 231, 232, 233, and 234 of the packed 2D image 230 may sequentially correspond to the plurality of regions 221, 222, 223, and 224 of the projected 2D image 220 respectively. The present disclosure is not limited to the example shown in FIG. 2, and various modifications and rearrangements may be performed according to embodiments.

Referring back to FIG. 1, in operation 140, the transmitting device may encode the packed picture. For encoding, for example, various video codec methods such as High Effeciency Video Coding (HEVC), Advanced Video Coding (AVC), etc. may be used.

The transmitting device according to an embodiment may divide the packed picture into a plurality of regions. The transmitting device may individually perform encoding on the plurality of regions of the packed 2D image. The transmitting device may perform encoding only on one or more regions to be transmitted among the plurality of regions of the packed picture. As an example, encoding may be performed on a group image of two or more regions among the plurality of regions of the packed picture. As another example, encoding may be performed on the entire packed picture.

In operation 150, the transmitting device may encapsulate the encoded data. The transmitting device may divide the encoded data and process the encoded data to comply with a determined transmission protocol through processing such as adding a header to the divided data. The transmitting device may transmit the encapsulated data. The transmitting device may transmit additional data related to the data and/or data (e.g., metadata) necessary to reproduce the data together with the encapsulated data or separately from the data.

The transmitting device may transmit a bitstream generated through encapsulation according to an MPEG Media Transport (MMT) method. The transmitting device according to an embodiment may generate a plurality of tracks corresponding to the 3D image, and transmit data for some or all of the plurality of tracks to a receiving device. The plurality of tracks may have data about different regions, or may have different quality levels.

Figure 3:
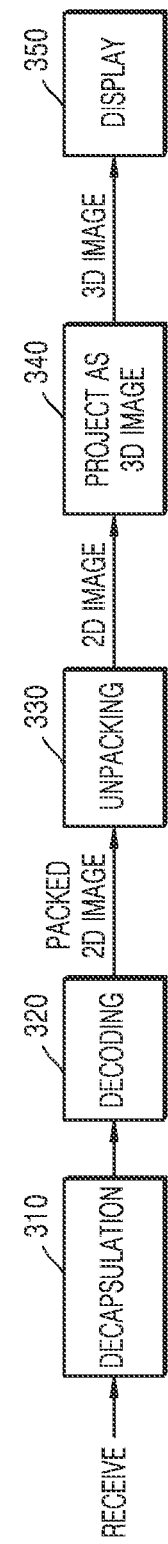
FIG. 3 illustrates a general data processing procedure of a receiving device for receiving data about a 3D image, according to an embodiment of the present disclosure.

FIG. 3 illustrates a general data processing procedure of a receiving device for receiving data about a 3D image according to an embodiment of the present disclosure.

The receiving device according to an embodiment of the present disclosure may be an AR device capable of providing augmented reality content to a user or a VR device capable of providing virtual reality content. In addition, the receiving device may refer to all types of devices capable of receiving and reproducing the data about the 3D image.

The receiving device according to an embodiment may receive the data about the 3D image transmitted from a transmitting device. In operation 310 of FIG. 3, the receiving device may perform decapsulation on the received data. Through deencapsulation in operation 310, the encoded data generated through encoding in operation 140 in FIG. 1 may be obtained.

In operation 320, the receiving device may perform decoding on the deencapsulated data. The packed 2D image may be reconstructed through decoding in operation 320.

The receiving device may display the 3D image by performing image rendering on the decoded data. Specifically, in operation 330, the receiving device may perform unpacking on the decoded data (i.e., the packed 2D image). Through unpacking in operation 330, the 2D image generated through projection in operation 120 in FIG. 1 may be reconstructed.

In order to perform unpacking, the receiving device may perform inverse transformation of modification and/or rearrangement of the plurality of regions of the projected 2D image performed in unpacking of operation 130 in FIG. 1. To this end, the receiving device may know about a packing method of the data performed by the transmitting device. For example, the packing method may be known in advance between the transmitting device and the receiving device. As an example, the transmitting device may transmit information about the packing method to the receiving device through a separate message such as metadata. As another example, the information about the packing method may be included in a header of transmission data generated through encapsulation and transmitted to the receiving device.

In operation 340, the receiving device may project the unpacked 2D image as a 3D image. The receiving device according to an embodiment may use reverse projection of projection used in operation 120 of FIG. 1 to project the 2D image as the 3D image, but is not limited thereto. The receiving device may generate the 3D image by projecting the unpacked 2D image as the 3D image.

In operation 350, the receiving device may display at least a part of the 3D image generated in operation 340 through a display device. For example, the receiving device may extract and render only data corresponding to a current field of view (FOV) from the 3D image.

Figure 4:
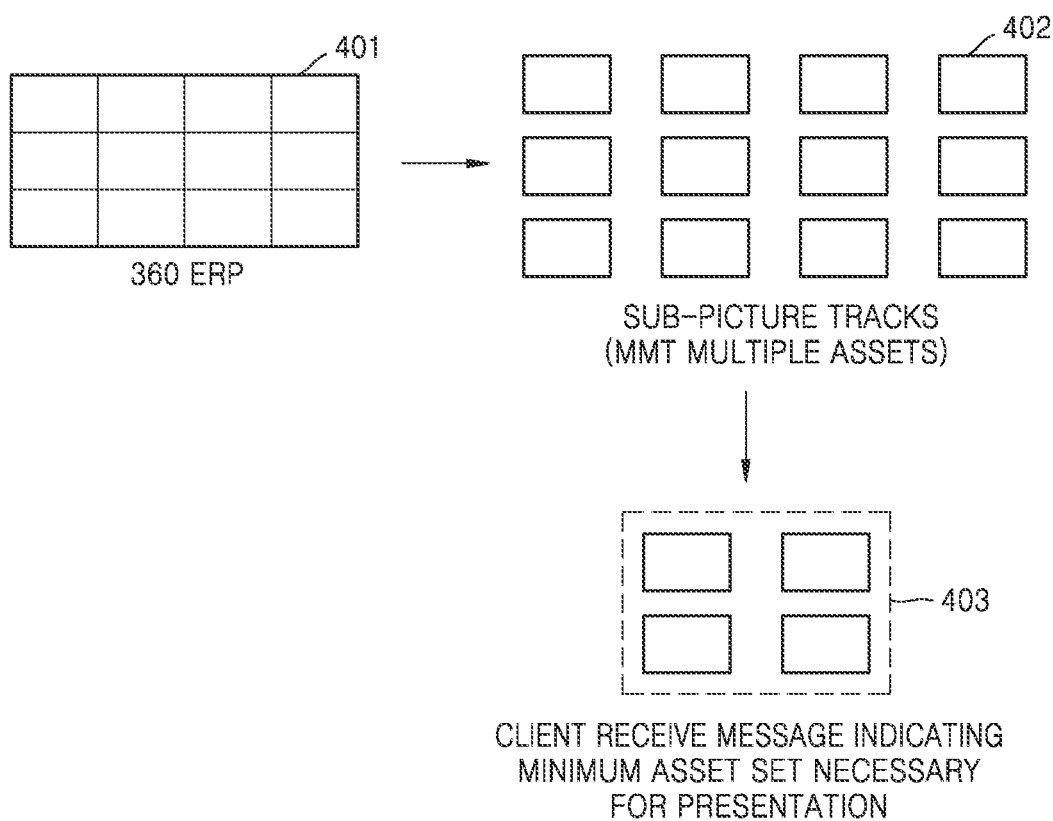
FIGS. 4 and 5 are diagrams illustrating a process in which a transmitting device divides and transmits an omnidirectional image into a plurality of sub-picture tracks, according to an embodiment of the present disclosure.
Figure 5:
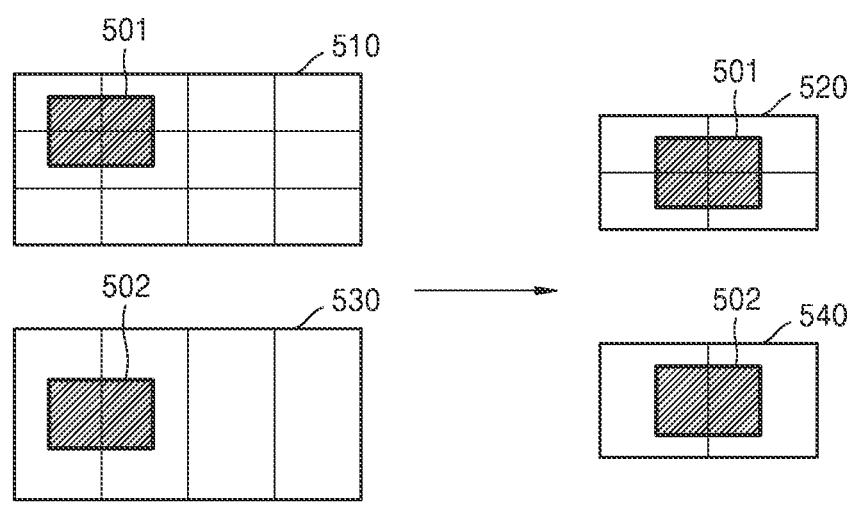

FIGS. 4 and 5 are diagrams illustrating a process in which a transmitting device divides and transmits an omnidirectional image into a plurality of sub-picture tracks according to an embodiment of the present disclosure.

As described above with reference to FIG. 1, the transmitting device according to an embodiment may generate a plurality of tracks corresponding to a 3D image, and transmit data with respect to some or all of the plurality of tracks to the receiving device. The plurality of tracks may have data with respect to different regions.

For example, the transmitting device according to an embodiment may divide a 360-degree projection picture 401 projected by an ERP method of FIG. 4 into sub-pictures 402 with respect to a plurality of regions, and transmit the sub-pictures 402 with respect to the plurality of regions through a plurality of sub-picture tracks. The sub-picture tracks may correspond to multiple assets in MMT technology.

An asset refers to a logical group of media processing units (MPUs) for carrying encoded media data. One asset may include at least one MPU that shares the same asset ID.

As shown in FIG. 4, the receiving device according to an embodiment may receive at least a part of the omnidirectional image through at least some assets of the plurality of assets 402. In this case, when the receiving device independently performs rendering and displays a single sub-picture, a hole may be generated in a 3D image provided to a user. Accordingly, the receiving device that receives 3D data needs to receive a message indicating a minimum asset set 403 necessary for presentation of the 3D image.

The transmitting device according to an embodiment of the present disclosure may transmit information about the minimum asset set 403 for presentation to the receiving device. Accordingly, the transmitting device according to an embodiment of the present disclosure transmits the information about the minimum asset set 403 to the receiving device when a plurality of sub-pictures constitute one composition picture, thereby preventing the receiving device independently from rendering a single sub-picture. Therefore, the transmitting device according to an embodiment may define the minimum asset set 403 for presentation before transmitting the content. A minimum set for presentation may be an entire composition picture or a fixed set for guard buffering.

The transmitting device according to an embodiment may perform dynamic viewport based guard fetching by dynamically updating sub-picture asset information according to a viewport feedback of the receiving device.

As shown in FIG. 5, when transmitting an omnidirectional image 510 through 12 assets, the transmitting device according to an embodiment may determine the minimum set for presentation to 4 assets based on a viewport 501. The transmitting device may transmit information indicating that data corresponding to the 4 assets needs to be rendered together with the content to the receiving device.

In addition, as shown in FIG. 5, when transmitting an omnidirectional image 530 through four assets, the transmitting device according to an embodiment may determine the minimum set for presentation to 2 assets based on a viewport 502. The transmitting device may transmit information indicating that data corresponding to the 2 assets needs to be rendered together with the content to the receiving device.

The transmitting device according to an embodiment may transmit sub-picture composition information related to a composition picture constituting sub-pictures included in the minimum set for presentation to the receiving device along with the content. The sub-picture composition information may include information about at least one of the coverage of at least one sub-picture, asset IDs of assets corresponding to the sub-pictures, and the number of sub-pictures constituting the composition picture. The receiving device may receive and render sub-pictures included in the minimum asset set for presentation based on the information received from the transmitting device. Alternatively, the receiving device may render the entire composition picture constituted by a sub-picture set based on the information received from the transmitting device. The sum of the coverage information of assets may be provided by a sub-picture asset information message.

Figure 6:
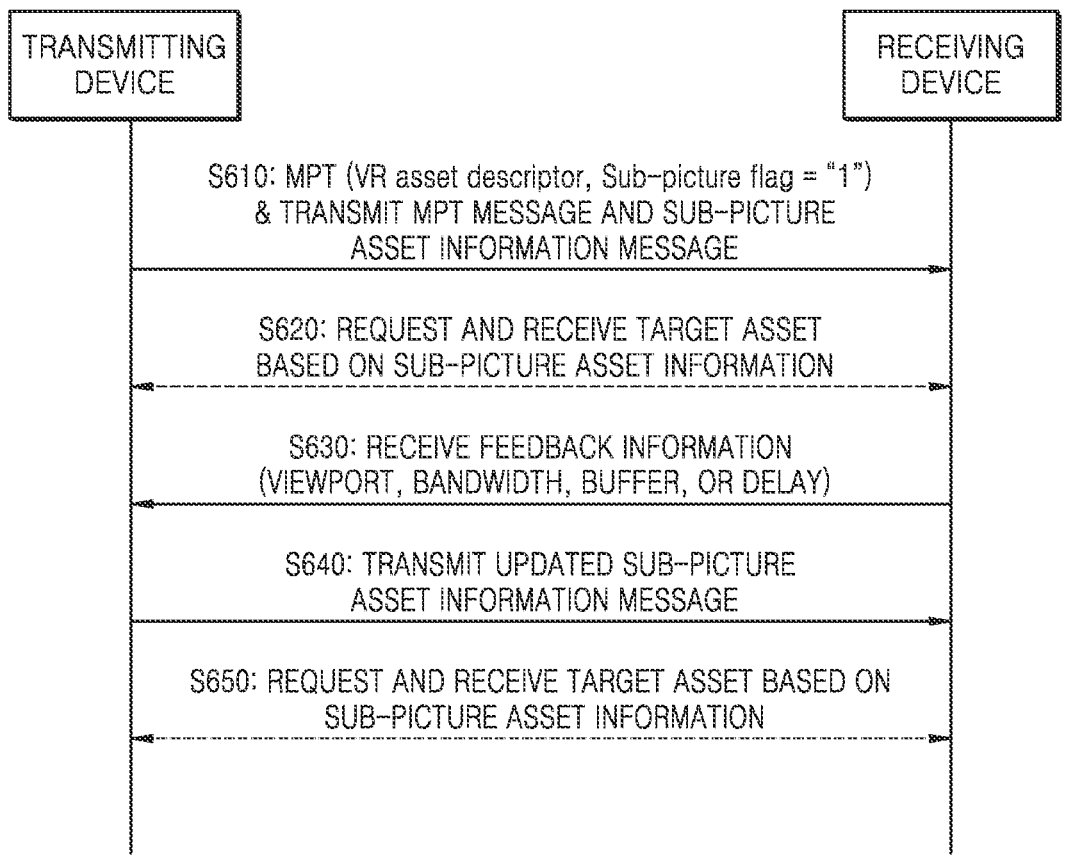
FIG. 6 is a signal flowchart of a system for communicating data about a 3D image, according to an embodiment of the present disclosure.

FIG. 6 is a signal flowchart of a system for communicating data about a 3D image according to an embodiment of the present disclosure.

In operation S610, a transmitting device according to an embodiment of the present disclosure may transmit an MPEG media transport (MMT) package table (MPT) message and a sub-picture asset information message to a receiving device. The MPT message may carry all of the MMT package table or a subset. An MPT message may include a VR asset descriptor.

MMT technology specified according to ISO/IEC 23008-1 defines an application-specific signaling message that allows delivery of application-specific information. Omnidirectional media format (OMAF) content specified according to ISO/IEC 23090-2 may be transmitted through an MMT. The asset descriptor may exist in all assets carrying the OMAF content. In particular, in order to transmit a plurality of asset sub-pictures, a VR information asset descriptor may be used in MMT signaling. For example, in order to stream VR content having a format according to the OMAF standard, a VR specific asset descriptor, a stereo video asset descriptor, and a VR application specific signaling message may be defined.

The VR information asset descriptor may describe which projection type is used to generate VR content, how the VR content is region-wise packed, and what region the sub-picture or the composition picture covers on a sphere, etc.

In addition, the VR information asset descriptor according to an embodiment of the present disclosure may include information for informing a receiving entity and a VR application about a plurality of assets including sub-pictures required to generate the composition picture. That is, the VR information asset descriptor may be used to indicate to the receiving device that the content currently transmitted by the transmitting device is included in the plurality of sub-picture assets.

The VR information asset descriptor according to an embodiment of the present disclosure may include a sub-picture flag. The sub-picture flag may indicate whether content in the corresponding asset is a sub-picture.

The transmitting device according to an embodiment of the present disclosure may inform the receiving device that the content transmitted through the corresponding asset is the sub-picture by transmitting a sub flag 1 through the VR information asset descriptor.

For example, when the sub-picture flag is 1, it may indicate that the content in the asset corresponding to the VR information asset descriptor is a sub-picture, and may indicate that the content needs not to be independently rendered from other sub-pictures constituting the composition picture.

In addition, the transmitting device may transmit sub-picture asset information including information about other sub-pictures constituting the composition picture together with the sub-picture. The sub-picture asset information may be used to indicate to the receiving device that the content currently transmitted by the transmitting device is included in the plurality of sub-picture assets. The sub-picture asset information may include information about at least one of coverage information of the entire composition picture, information about assets including sub-pictures constituting the entire composition picture, or coverage information of each sub-picture.

According to an embodiment of the present disclosure, in order for the receiving device to identify content in an asset as the sub-picture, the sub-picture flag may be set to 1 in the VR information asset descriptor. In this case, after identifying the sub-picture flag, the receiving device may refer to a related message including information about related assets for configuring and rendering the composition picture. The related message may include, for example, a VR sub-picture asset information message.

In operation S620, the receiving device according to an embodiment of the present disclosure may request a target asset based on the sub-picture asset information received from the transmitting device. The transmitting device according to an embodiment of the present disclosure may transmit the target asset in response to a request. The transmitting device may transmit the plurality of sub-pictures through a plurality of assets including the target asset. For example, the receiving device may request the transmitting device to transmit content through assets determined based on the sub-picture asset information, and may receive the content from the transmitting device in response to the request.

The receiving device according to an embodiment of the present disclosure may not render each sub-picture alone, but may render the sub-pictures constituting the composition picture determined based on the sub-picture asset information together.

In operation S630, the transmitting device according to an embodiment of the present disclosure may receive feedback information from the receiving device. The feedback information may include information about at least one of a viewport, a bandwidth, a buffer, or a delay. The viewport information may be information specifying a viewport that is a region to be displayed by the receiving device.

In operation S640, the transmitting device according to an embodiment of the present disclosure may transmit the sub-picture asset information updated based on the feedback information to the receiving device. For example, the transmitting device may determine assets including the sub-pictures constituting the composition picture, based on the viewport information received as the feedback information. The transmitting device may transmit information about the determined assets to the receiving device.

In operation S650, the receiving device according to an embodiment of the present disclosure may request a target asset based on the updated sub-picture asset information received from the transmitting device. The transmitting device according to an embodiment of the present disclosure may transmit the target asset in response to a request. The transmitting device may transmit the plurality of sub-pictures through a plurality of assets including the target asset based on the updated sub-picture asset information.

Hereinafter, operations of the transmitting device and the receiving device according to an embodiment of the present disclosure will be described in more detail with reference to FIGS. 7 to 10.

Figure 7:
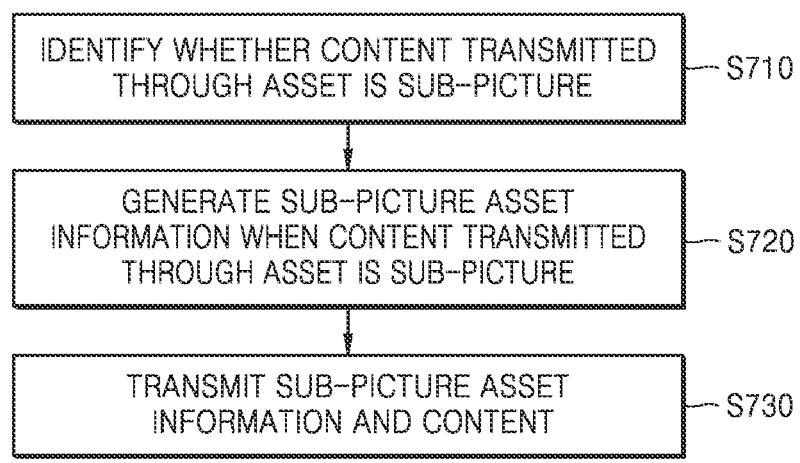
FIG. 7 is a flowchart of a method in which a transmitting device transmits video content, according to an embodiment of the present disclosure.

FIG. 7 is a flowchart of a method in which a transmitting device transmits video content according to an embodiment of the present disclosure. The transmitting device according to an embodiment of the present disclosure may transmit data compressed according to OMAF technology defined by ISO/IEC.

In operation S710, the transmitting device according to an embodiment of the present disclosure may identify whether content transmitted through an asset is a sub-picture. Asset may mean a logical group of MPUs for carrying encoded media data.

In operation S720, when the content transmitted through the asset is the sub-picture, the transmitting device according to an embodiment of the present disclosure may generate sub-picture asset information including information about other sub-pictures constituting a composition picture together with the sub-picture.

The sub-picture may mean a picture representing a spatial subset of original content. When the content transmitted through the asset is the sub-picture, a receiving device receiving the content may render the content only by referring to information about other sub-pictures constituting the composition picture together with the corresponding sub-picture. Meanwhile, when the content transmitted through the asset is the entire composition picture, the receiving device may independently render the content transmitted through the asset.

The sub-picture asset information may include information about at least one of coverage information covered by the picture, an identifier of the asset, and the number of sub-picture video assets described by the sub-picture asset information. The coverage information may include coverage information covered by a sub-picture transmitted through an asset and coverage information covered by a composition picture.

In operation S730, the transmitting device according to an embodiment of the present disclosure may transmit the sub-picture asset information and the content.

Before transmitting the sub-picture asset information, the transmitting device according to an embodiment of the present disclosure may transmit an asset descriptor including information indicating whether the content transmitted through the asset is the sub-picture.

For example, the transmitting device may transmit a VR asset descriptor including a sub picture flag indicating whether the content transmitted through the asset is the sub-picture. When the content transmitted through the asset is the sub-picture, the sub picture flag may be set to 1. When the content transmitted through the asset is an entire composition picture, the sub picture flag may be set to 0.

The receiving device according to an embodiment may request a target asset based on the sub-picture asset information received from the transmitting device. The transmitting device according to an embodiment of the present disclosure may transmit the target asset in response to a request. For example, the transmitting device may transmit a plurality of sub-pictures through a plurality of assets including the target asset. Alternatively, the transmitting device may transmit the entire composition picture through the target asset.

Meanwhile, the transmitting device according to an embodiment may receive feedback information from the receiving device. For example, the feedback information may include at least one of viewport information, bandwidth information, buffer information, or delay information. The transmitting device according to an embodiment may update the sub-picture asset information based on the feedback information and transmit the updated sub-picture asset information to the receiving device.

Figure 8:
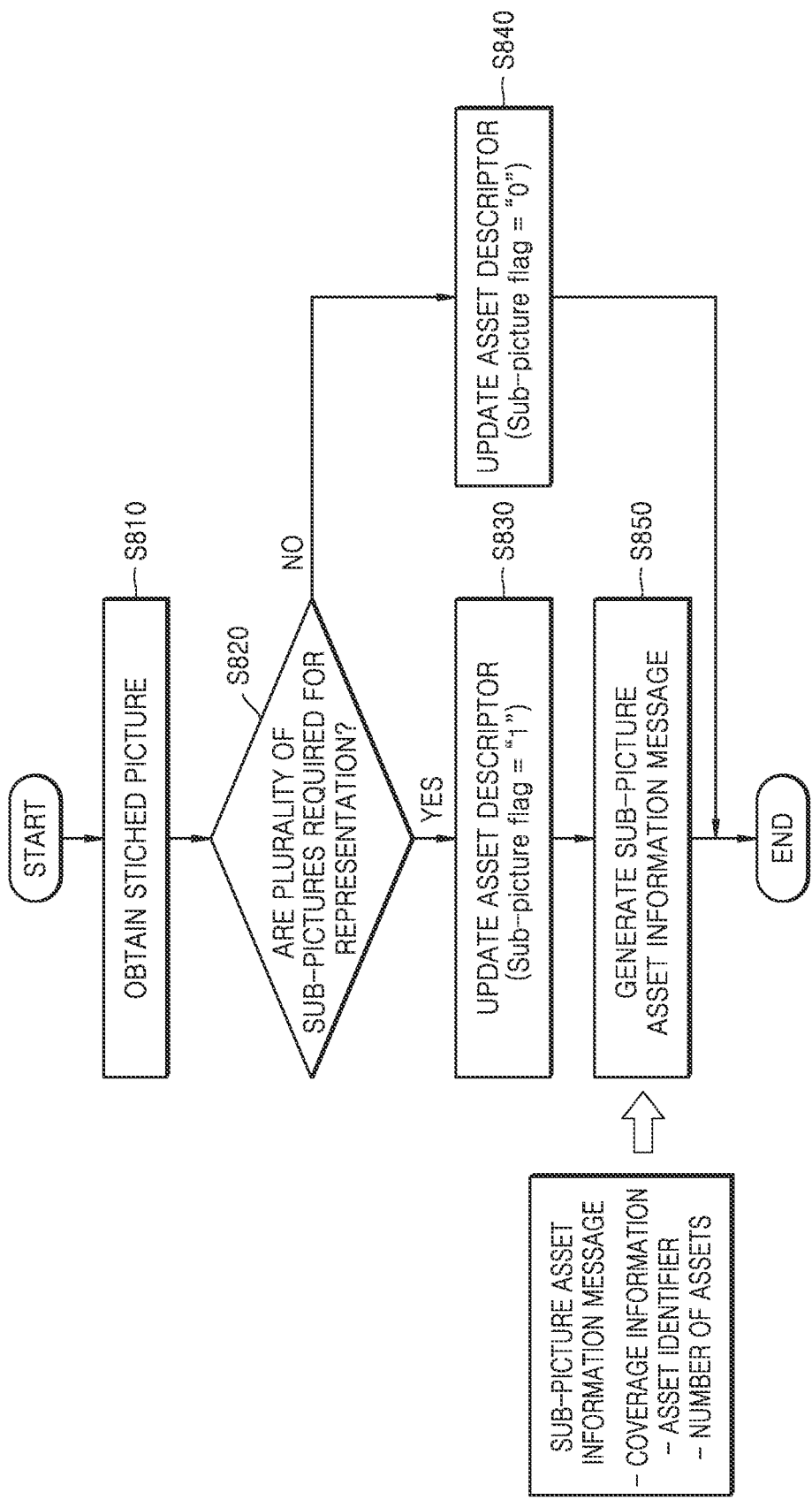
FIG. 8 is a flowchart of a method in which a transmitting device generates information related to video content, according to an embodiment of the present disclosure.

Hereinafter, a method in which a transmitting device generates information related to video content according to an embodiment will be described in detail with reference to FIG. 8.

In operation S810, the transmitting device according to an embodiment may obtain a stitched picture. The transmitting device according to an embodiment may obtain the stitched picture generated by stitching images obtained from a plurality of cameras captured in various directions.

In operation S820, the transmitting device according to an embodiment may determine whether a plurality of sub-pictures are required to represent the stitched picture.

When the stitched picture includes the plurality of sub-pictures, in operation S820, the transmitting device according to an embodiment may update an asset descriptor. For example, the transmitting device may update a sub-picture flag included in the asset descriptor to 1. The transmitting device according to an embodiment may inform a receiving device that content transmitted through a corresponding asset is a sub-picture by transmitting the sub-picture flag 1 through the asset descriptor.

In operation S850, the transmitting device according to an embodiment may generate a sub-picture asset information message when the stitched picture includes a plurality of sub-pictures.

The transmitting device according to an embodiment may generate sub-picture asset information including information about other sub-pictures constituting a composition picture such that sub-pictures constituting the composition picture may be rendered together. For example, the sub-picture asset information message may include information about at least one of coverage information of the entire composition picture, information about assets including sub-pictures constituting the entire composition picture (e.g., the number of assets constituting the composition picture and/or IDs of corresponding assets, etc.) or coverage information of the sub-picture.

When the entire stitched picture is transmitted as a single picture, in operation S840, the transmitting device according to an embodiment may update the sub-picture flag included in the asset descriptor to 0. The transmitting device according to an embodiment may inform the receiving device that the content transmitted through the asset is the entire composition picture by transmitting the sub-picture flag 0 through the asset descriptor.

Figure 9:
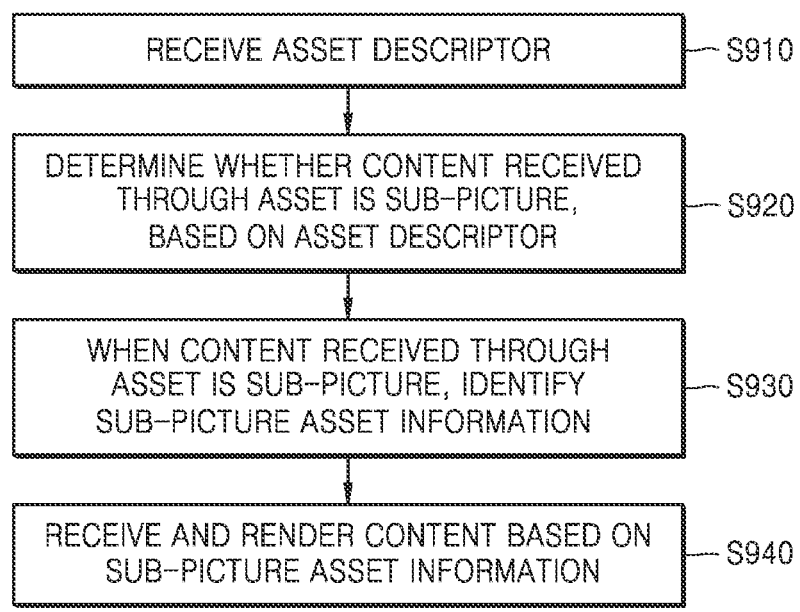
FIG. 9 is a flowchart illustrating a method in which a receiving device receives and processes video content, according to an embodiment of the present disclosure.

FIG. 9 is a flowchart illustrating a method in which a receiving device receives and processes video content according to an embodiment of the present disclosure. A transmitting device according to an embodiment of the present disclosure may receive data compressed according to OMAF technology defined by ISO/IEC.

In operation S910, according to an embodiment, the receiving device may receive an asset descriptor. An asset may mean a logical group of MPUs for carrying encoded media data.

The receiving device may receive content through at least one asset, and receive information about content received through each asset through the asset descriptor. The asset descriptor according to an embodiment of the present disclosure may include information indicating whether the content received through the asset is a sub-picture.

In operation S920, according to an embodiment, the receiving device may determine whether the content received through the asset is the sub-picture, based on the asset descriptor.

For example, the receiving device may receive a VR asset descriptor including a sub picture flag indicating whether the content transmitted through the asset is the sub-picture. According to an embodiment, when the sub picture flag is 1, the receiving device may determine that the content transmitted through the asset is the sub-picture. Meanwhile, when the sub picture flag is 0, the receiving device may determine that the content transmitted through the asset is the entire composition picture.

In operation S930, according to an embodiment, when the content received through the asset is the sub-picture, the receiving device may identify sub-picture asset information including information about other sub-pictures constituting the composition picture together with the sub-picture.

The sub-picture asset information may include at least one of coverage information covered by a picture, an identifier of the asset, or the number of sub-picture video assets described by the sub-picture asset information. The coverage information may include coverage information covered by a sub-picture received through the asset and coverage information covered by the composition picture.

In operation S940, according to an embodiment, the receiving device may receive and render content based on the sub-picture asset information.

For example, according to an embodiment, the receiving device may receive and render content corresponding to the sub-picture and the composition picture configured as other sub-pictures. Meanwhile, according to an embodiment, when the content received through the asset is the entire composition picture, the receiving device may independently render the content received through the asset.

Meanwhile, the receiving device according to an embodiment of the present disclosure may transmit feedback information to the transmitting device. The receiving device may receive updated sub-picture asset information in response to the feedback information. For example, the feedback information may include at least one of viewport information, bandwidth information, buffer information, or delay information.

Hereinafter, a method in which a receiving device receives and processes video content according to an embodiment will be described in detail with reference to FIG. 10.

In operation S1010, the receiving device according to an embodiment may determine whether received content includes a plurality of assets. The receiving device may determine whether the content received through an asset is a sub-picture (i.e., whether the content is received through the plurality of assets) based on an asset descriptor received from a transmitting device.

For example, when a sub picture flag is 1, the receiving device may determine that the received content includes the plurality of assets. Meanwhile, when the sub picture flag is 0, the receiving device may determine that the content is received through one asset.

In operation S1020, when it is determined that the received content includes the plurality of assets, the receiving device may decode and buffer a sub-picture.

In operation S1040, the receiving device according to an embodiment may obtain sub-pictures corresponding to a minimum asset set for rendering, based on sub-picture asset information. For example, the sub-picture asset information message may include information about at least one of coverage information of the entire composition picture, information about assets including sub-pictures constituting the entire composition picture (e.g., the number of assets constituting the composition picture and/or IDs of corresponding assets, etc.) or coverage information of the sub-picture.

In operation S1030, when it is determined that the received content includes one asset, the receiving device according to an embodiment may decode the corresponding content.

In operation S1050, the receiving device according to an embodiment may render a picture corresponding to the minimum asset set.

For example, when it is determined that the received content includes a plurality of assets, the receiving device may render sub-pictures constituting an entire composition picture together. Meanwhile, when it is determined that the received content includes one asset, the receiving device may independently render a picture received through the corresponding asset.

According to an embodiment, when the sub-picture is larger than a viewport, a sub-picture flag may be 0 or 1. The number of assets constituting the minimum asset set specified in the message may vary depending on the message. For example, the minimum asset set may vary by 180' or 360'.

The number of assets constituting the minimum asset set specified in the message may be updated by the server according to bandwidth, content, and the like. Accordingly, when all assets in a specified sub-picture set (i.e., all assets listed in the message) are not received, reproduction of a client (or a reproduction device) may be restricted. Because coverage information is specified for each asset, coverage information of an entire sub-picture set may be known by arranging a set of assets.

Meanwhile, according to an embodiment, when the sub-picture is smaller than the viewport, the sub-picture flag is always 1.

When the sub-picture flag is 1, the sub-picture asset information message may provide a guide for decoding and rendering. When a user of the receiving device moves to the left after viewing a 3D image corresponding to 0 to 180 degrees, the receiving device may receive assets of 300 to 120 degrees and perform decoding and rendering. When the sub-picture is smaller than the viewport, the minimum asset set is no longer a sub-picture, and the sub-picture asset information message may provide necessary coverage information of the assets.

FIG. 11 is a diagram illustrating syntax of an asset descriptor transmitted with content according to an embodiment of the present disclosure.

As shown in FIG. 11, the asset descriptor according to an embodiment may include a sub picture flag. The sub picture flag may indicate whether content transmitted through an asset is a sub-picture. When the content transmitted through the asset is the sub-picture and should not be rendered independently from other sub-pictures constituting a composition picture, the sub_picture flag may be set to 1. When the content transmitted through the asset is an entire composition picture, the sub_picture flag may be set to 0.

FIG. 12 is a table listing virtual reality application message types used to transmit virtual reality content according to an embodiment of the present disclosure.

A new asset descriptor with respect to OMAF VR content may be defined as a VR information asset descriptor. The VR information asset descriptor may exist in all assets carrying OMAF content.

For a specific VR signaling message, the following application message type set may be defined.

VRViewDependentSupportQuery: (The client uses this command to discover if the server supports view-dependent streaming.)

VRViewDependentSupportResponse: (The server replies with an indication of its support capability for view-dependent streaming.)

VRViewportChangeFeedback: (The receiving entity sends an indication of the current viewport to the sending entity.)

VRViewDependentAssetsInformation: (Upon determining the set of OMAF Assets that match the requested viewport, the sending entity sends this message to inform the client about the new OMAF Assets that will be streamed to the receiving entity.)

The VRViewportChangeF eedback and VRViewDependentAssetsInformation messages are used together to support server-based view-dependent streaming of OMAF assets. (To support guided rendering, where the renderer follows an indicated Region of Interest, or to follow the recommended viewport timed metadata track of OMAF, the VRROIGuide application message type is defined.)

FIG. 13 illustrates syntax of sub-picture asset information transmitted with content according to an embodiment of the present disclosure.

A transmitting device according to the exemplary embodiment of the present disclosure may inform a receiving device that content transmitted through the corresponding asset is a sub-picture by transmitting a sub flag 1 through a VR information asset descriptor illustrated in FIG. 11. The transmitting device may transmit sub-picture asset information including information about other sub-pictures constituting a composition picture together with the sub-picture.

The sub-picture asset information may be used to indicate to the receiving device that content currently transmitted by the transmitting device is included in a plurality of sub-picture assets. The sub-picture asset information may include information about at least one of coverage information of the entire composition picture, information about assets including sub-pictures constituting the entire composition picture, and coverage information of each sub-picture.

In FIG. 13, message_id represents an identifier of a VRSub-pictureAsset Information message.

version represents a version of the VRSub-pictureAsset Information message.

length represents a length of the VRSub-pictureAsset Information message in bytes, and is calculated from the start of a next field to the last byte of a VRViewDependentSupportQuery message. The value of this field should not be equal to 0.

application_identifier represents an application program identifier as an urn that uniquely identifies an application program to consume content of this message.

app_message type defines a message type for each application program provided in FIG. 12.

number_of assets specifies the number of sub-picture video assets described by this descriptor.

asset id_length specifies a length of a sub-picture video asset identifier in bytes.

asset_id byte includes a byte of the sub-picture video asset identifier.

ContentCoverageInfoStruct( ) may represent a sphere region covered by the composition picture when is outside the number_of_assets loop in the syntax of FIG. 13. Alternatively, ContentCoverageInfoStruct( ) may represent a sphere region covered by a sub-picture asset when is inside the number_of_assets loop in the syntax of FIG. 13.

Hereinafter, a configuration of a transmitting device 1400 according to an embodiment will be described. Each configuration of the transmitting device 1400 described below may perform each operation of the method described above with reference to FIGS. 7 and 8. Redundant descriptions are omitted.

Figure 14:
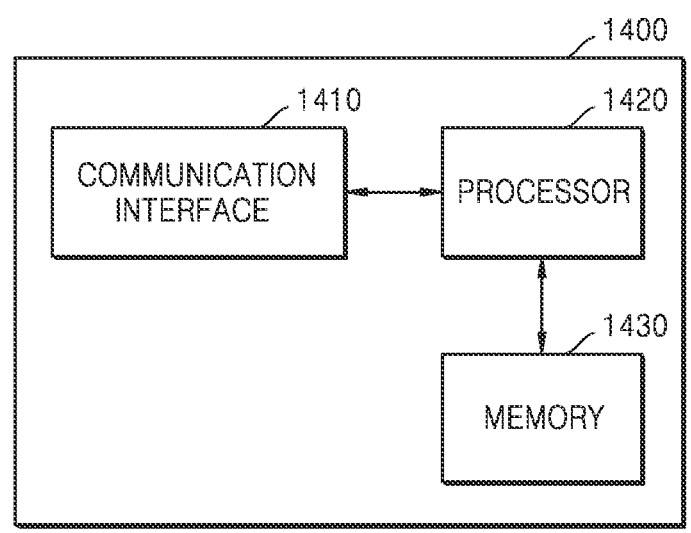
FIG. 14 is a block diagram of a transmitting device according to an embodiment of the present disclosure.

FIG. 14 is a block diagram of a transmitting device 1400 according to an embodiment.

As shown in FIG. 14, the transmitting device 1400 according to an embodiment may include a communication interface 1410, at least one processor 1420 connected to the communication interface 1410, and a memory 1430. However, not all of the illustrated components are essential components. The transmitting device 1400 may be implemented by more components than the illustrated components, and the transmitting device 1400 may be implemented by fewer components than the illustrated components. For example, the transmitting device 1400 according to an embodiment of the present disclosure may be a server for providing data or service related to a 3D image.

The transmitting device 1400 according to an embodiment of the present disclosure may include the processor 1420 that transmits video content including a series of 3D images by executing one or more instructions stored in the memory 1430.

The processor 1420 according to an embodiment may identify whether content transmitted to the receiving device through the asset is a sub-picture. For example, the processor 1420 may update a sub-picture flag included in an asset descriptor to 1 when the content transmitted to the receiving device through the asset is the sub-picture. When the content transmitted to the receiving device through the asset is not the sub-picture, the processor 1420 may update the sub-picture flag included in the asset descriptor to 0.

When the content transmitted through the asset is the sub-picture, the processor 1420 may generate sub-picture asset information including information about other sub-pictures constituting a composition picture together with the sub-picture. The processor 1420 according to an embodiment may generate and transmit the sub-picture asset information such that the sub-pictures constituting the composition picture may be rendered together.

The processor 1420 may control the communication interface 1410 to transmit the sub-picture asset information and the content.

Meanwhile, the transmitting device 1400 according to an embodiment may receive feedback information from a receiving device. For example, the feedback information may include at least one of viewport information, bandwidth information, buffer information, or delay information. The transmitting device 1400 according to an embodiment may update the sub-picture asset information based on the feedback information and transmit the updated sub-picture asset information to the receiving device.

The receiving device according to an embodiment may request a target asset based on the updated sub-picture asset information received from the transmitting device 1400. The transmitting device 1400 according to an embodiment of the present disclosure may transmit the target asset in response to a request.

Hereinafter, a configuration of a receiving device 1500 according to an embodiment will be described. Each configuration of the receiving device 1500 described below may perform each operation of the method described above with reference to FIGS. 9 and 10. Redundant descriptions are omitted.

Figure 15:
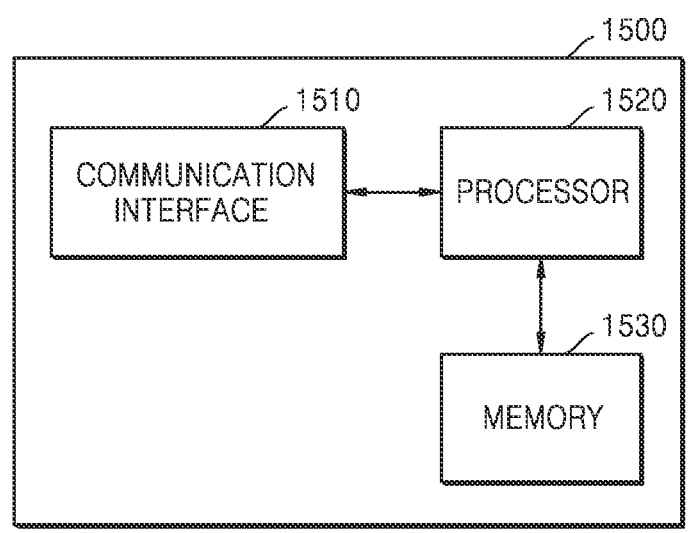
FIG. 15 is a block diagram of a receiving device according to an embodiment of the present disclosure.

FIG. 15 is a block diagram of a receiving device 1500 according to an embodiment.

As shown in FIG. 15, the receiving device 1500 according to an embodiment may include a communication interface 1510, at least one processor 1520 connected to the communication interface 1510, and a memory 1530. However, not all of the illustrated components are essential components. The receiving device 1500 may be implemented by more components than the illustrated components, and the receiving device 1500 may be implemented by fewer components than the illustrated components than the illustrated components. The receiving device 1500 according to an embodiment of the present disclosure may include all types of devices capable of receiving and reproducing 3D image data.

The receiving device 1500 according to an embodiment of the present disclosure may include the processor 1520 that transmits video content including a series of 3D images by executing one or more instructions stored in the memory 1530.

The processor 1520 according to an embodiment may determine whether content received through an asset is a sub-picture based on an asset descriptor received through the communication interface 1510.

For example, the receiving device may receive a VR asset descriptor including a sub picture flag indicating whether the content transmitted through the asset is the sub-picture. According to an embodiment, when the sub picture flag is 1, the receiving device may determine that the content transmitted through the asset is the sub-picture. Meanwhile, when the sub picture flag is 0, the receiving device may determine that the content transmitted through the asset is an entire composition picture.

When the content received through the asset is the sub-picture, the processor 1520 may identify sub-picture asset information including information about other sub-pictures constituting the composition picture together with the sub-picture. The processor 1520 may receive and render the content based on the sub-picture asset information.

For example, according to an embodiment, the receiving device 1500 may receive and render content corresponding to the sub-picture and a composition picture including other sub-pictures. Meanwhile, according to an embodiment, when the content received through the asset is the entire composition picture, the receiving device 1500 may independently render the content received through the asset.

Meanwhile, the receiving device 1500 according to an embodiment of the present disclosure may transmit feedback information to the transmitting device 1400. The receiving device 1500 may receive the updated sub-picture asset information from the transmitting device 1400 in response to the feedback information. For example, the feedback information may include at least one of viewport information, bandwidth information, buffer information, and delay information.

The receiving device 1500 according to an embodiment may request a target asset based on the updated sub-picture asset information received from the transmitting device 1400. The transmitting device 1400 according to an embodiment of the present disclosure may transmit the target asset in response to a request.

Meanwhile, the above-described embodiments may be written as a program executable in a computer, and may be implemented in a general-purpose digital computer which operates the program using a computer-readable medium. In addition, the structure of the data used in the above-described embodiment may be recorded on the computer readable medium through various means. In addition, the above-described embodiments may be implemented in the form of a recording medium including instructions executable by a computer, such as a program module executed by the computer. For example, methods implemented as software modules or algorithms may be stored in a computer readable recording medium as codes or program instructions that the computer may read and execute.

Computer readable media be any recording media that may be accessed by the computer, and may include volatile and nonvolatile media, and removable and non-removable media. The computer readable medium may include a magnetic storage medium, such as a ROM, a floppy disk, a hard disk, and the like, and may include an optical reading medium such as a CD-ROM, a DVD, etc., but is not limited thereto. In addition, the computer readable medium may include computer storage media and communication media.

In addition, a plurality of computer readable recording media may be distributed over network-connected computer systems, and data stored in the distributed recording media, for example, program instructions and codes, may be executed by at least one computer.

The specific implementations described in the present disclosure are merely an example, and do not limit the scope of the disclosure in any way. For brevity of the specification, descriptions of conventional electronic configurations, control systems, software, and other functional aspects of the systems may be omitted.

The invention claimed is:

1. A method of transmitting video content through a plurality of assets, the method comprising:
    transmitting an asset descriptor comprising information indicating whether a content transmitted through an asset is a spatial subset of the video content in omnidirectional media format (OMAF);
    identifying a first asset including a sub-picture, wherein the sub-picture is configured to constitute a composition picture related to the video content;
    obtaining sub-picture asset information comprising information about at least one of second asset including another sub-picture configured to constitute the composition picture related to the video content; and
    transmitting the sub-picture asset information for the at least one of the second asset related to the first asset and the content transmitted through the first asset.

2. The method of claim 1, wherein the asset is a logical group of media processing units (MPUs) for carrying encoded media data.

3. The method of claim 1, wherein the video content is data compressed according to OMAF technology defined by ISO/IEC.

4. The method of claim 1,
    wherein, in case that the content transmitted through the asset is a spatial subset of the video content, a receiving device receiving the content renders the content only by referring to the information about at least one of second asset, and
    wherein, in case that the content transmitted through the asset is an entire composition picture, the receiving device independently renders the content.

5. The method of claim 1, further comprising:
    transmitting a virtual reality (VR) asset descriptor comprising a sub_picture flag indicating whether the content transmitted through the asset is the spatial subset of the video content,
    wherein, in case that the content transmitted through the first asset is the sub-picture, the sub_picture flag is set to 1, and
    wherein, in case that the content transmitted through the first asset is an entire composition picture, the sub_picture flag is set to 0.

6. The method of claim 1, wherein the sub-picture asset information comprises at least one of coverage information covered by a picture, an identifier of the second asset, or a number of second assets described by the sub-picture asset information.

7. The method of claim 6, wherein the coverage information includes coverage information covered by a sub-picture transmitted through the second asset and coverage information covered by the composition picture.

8. The method of claim 1, further comprising:
    receiving feedback information;
    updating the sub-picture asset information based on the feedback information; and
    transmitting the updated sub-picture asset information,
    wherein the feedback information comprises at least one of viewport information, bandwidth information, buffer information, or delay information.

9. A method of receiving video content through a plurality of assets, the method comprising:
    receiving an asset descriptor that comprises information indicating whether a content received through an asset is a spatial subset of the video content in omnidirectional media format (OMAF);
    determining whether the content received through a first asset is a sub-picture, wherein the sub-picture is configured to constitute a composition picture related to the video content;
    in case that the content received through the first asset is the sub-picture, identifying sub-picture asset information comprising information about at least one of second asset including another sub-picture configured to constitute the composition picture related to the video content; and
    receiving and rendering the composition picture based on the sub-picture asset information, the content received through the first asset, and content received through at least one of the second asset.

10. The method of claim 9, wherein the asset is a logical group of media processing units (MPUs) for carrying encoded media data.

11. The method of claim 9, wherein the video content is data compressed according to OMAF technology defined by ISO/IEC.

12. The method of claim 9,
    wherein the receiving of the asset descriptor comprises:
        receiving a VR asset descriptor comprising a sub_picture flag indicating whether the content transmitted through the asset is the spatial subset of the video content, and
    wherein the determining of whether the content received through the first asset is the sub-picture based on information of the asset descriptor comprises:
        in case that the sub_picture flag is 1, determining that the content received through the first asset is the sub-picture, and
        in case that the sub_picture flag is 0, determining that the content received through the first asset is an entire composition picture.

13. The method of claim 9, wherein the receiving and rendering of the composition picture comprises:
    in case that the content received through the first asset is an entire composition picture, rendering the content received through the first asset alone.

14. The method of claim 9, wherein the sub-picture asset information comprises at least one of coverage information covered by a picture, an identifier of the second asset, or a number of second assets described by the sub-picture asset information.

15. The method of claim 14, wherein the coverage information comprises coverage information covered by a sub-picture received through the second asset and coverage information covered by the composition picture.

16. The method of claim 9, further comprising:
    transmitting feedback information; and
    in response to the feedback information, receiving updated sub-picture asset information,
    wherein the feedback information comprises at least one of viewport information, bandwidth information, buffer information, or delay information.

17. A device comprising:
    a communication interface configured to receive video content through a plurality of assets; and
    at least one processor connected to the communication interface,
    wherein the at least one processor is configured to:
        based on an asset descriptor received through the communication interface, determine whether content received through a first asset is a sub-picture,
        in case that the content received through the first asset is the sub-picture, identify sub-picture asset information comprising information about at least one of second asset including another sub-picture configured to constitute a composition picture related to the video content, and receive and render the composition picture based on the sub-picture asset information, the content received through the first asset, and content received through at least one of the second asset, wherein the asset descriptor comprises information indicating whether a content received through an asset is a spatial subset of the video content in omnidirectional media format, OMAF, and wherein the sub-picture is configured to constitute a composition picture related to the video content.

* * * * *